US012383466B2

(12) United States Patent
Sanders et al.

(10) Patent No.: US 12,383,466 B2
(45) Date of Patent: Aug. 12, 2025

(54) FLUID TRANSFER DEVICE AND PACKAGING THEREFOR

(71) Applicant: Becton Dickinson and Company Limited, Dun Laoghaire (IE)

(72) Inventors: Laurie Sanders, Glen Ridge, NJ (US); Jayeon Kim, River Edge, NJ (US)

(73) Assignee: Becton Dickinson and Company Limited, Dun Laoghaire (IE)

( * ) Notice: Subject to any disclaimer, the term of this patent is extended or adjusted under 35 U.S.C. 154(b) by 994 days.

(21) Appl. No.: 17/483,404

(22) Filed: Sep. 23, 2021

(65) Prior Publication Data

US 2022/0008294 A1 Jan. 13, 2022

Related U.S. Application Data

(63) Continuation of application No. 15/982,114, filed on May 17, 2018, now Pat. No. 11,154,457, which is a continuation of application No. 14/691,845, filed on Apr. 21, 2015, now Pat. No. 9,999,570.

(60) Provisional application No. 61/982,049, filed on Apr. 21, 2014.

(51) Int. Cl.
*A61J 1/20* (2006.01)

(52) U.S. Cl.
CPC ........... *A61J 1/2048* (2015.05); *A61J 1/2055* (2015.05); *A61J 1/2096* (2013.01)

(58) Field of Classification Search
CPC ...... A61J 1/2048; A61J 1/2055; A61J 1/2096; A61J 1/2065; A61M 2039/1044; A61M 39/1011; A61M 2039/1016; A61M 16/081
See application file for complete search history.

(56) References Cited

U.S. PATENT DOCUMENTS

| | | | |
|---|---|---|---|
| 4,436,125 | A | 3/1984 | Blenkush |
| 4,564,054 | A | 1/1986 | Gustavsson |
| 4,673,404 | A | 6/1987 | Gustavsson |
| 4,932,937 | A | 6/1990 | Gustavsson et al. |
| 5,052,725 | A | 10/1991 | Meyer et al. |

(Continued)

FOREIGN PATENT DOCUMENTS

| | | | |
|---|---|---|---|
| CN | 103182127 | A | 7/2013 |
| CN | 103648578 | A | 3/2014 |

(Continued)

*Primary Examiner* — Susan S Su
*Assistant Examiner* — Erin A Kim
(74) *Attorney, Agent, or Firm* — The Webb Law Firm

(57) ABSTRACT

A fluid transfer system includes a container having a body having a sidewall extending between an open top end and a bottom end along a central axis to define an interior cavity, and at least one protrusion extending from an interior portion of the sidewall into the interior cavity. The system further including a connector configured for receipt within the interior cavity. The connector having a body having a distal end, a proximal end, and a sidewall extending between the distal end and the proximal end and defining a fluid passageway therethrough, and a locking arrangement provided on at least a portion of an inner member of the connector and accessible through at least a portion of an outer member of the connector. The locking arrangement is configured for cooperating with the at least one protrusion to prevent rotation of the inner member relative to the outer member.

6 Claims, 16 Drawing Sheets

(56) References Cited

U.S. PATENT DOCUMENTS 5,104,158 A 4/1992 Meyer et al.
5,122,129 A 6/1992 Olson et al.
5,280,876 A 1/1994 Atkins
5,290,254 A 3/1994 Vaillancourt
5,322,518 A 6/1994 Schneider et al.
5,334,188 A 8/1994 Inoue et al.
5,360,011 A 11/1994 McCallister
5,395,348 A 3/1995 Ryan
5,437,650 A 8/1995 Larkin et al.
5,464,123 A 11/1995 Scarrow
5,472,430 A 12/1995 Vaillancourt et al.
5,478,328 A 12/1995 Silverman et al.
5,487,728 A 1/1996 Vaillancourt
5,507,733 A 4/1996 Arkin et al.
5,509,911 A 4/1996 Cottone, Sr. et al.
5,545,152 A 8/1996 Funderburk et al.
5,607,392 A 3/1997 Kanner
5,609,584 A 3/1997 Gettig et al.
5,611,792 A 3/1997 Gustafsson
5,647,845 A 7/1997 Haber et al.
5,685,866 A 11/1997 Lopez
5,807,347 A 9/1998 Bonaldo
5,897,526 A 4/1999 Vaillancourt
6,063,068 A 5/2000 Fowles et al.
6,089,541 A 7/2000 Weinheimer et al.
6,113,583 A 9/2000 Fowles et al.
6,132,404 A 10/2000 Lopez
6,139,534 A 10/2000 Niedospial, Jr. et al.
6,221,041 B1 4/2001 Russo
6,221,056 B1 4/2001 Silverman
6,343,629 B1 2/2002 Wessman et al.
6,358,236 B1 3/2002 DeFoggi et al.
6,378,714 B1 4/2002 Jansen et al.
6,409,708 B1 6/2002 Wessman
6,474,375 B2 11/2002 Spero et al.
6,478,788 B1 11/2002 Aneas
6,544,246 B1 4/2003 Niedospial, Jr.
6,551,299 B2 4/2003 Miyoshi et al.
6,585,695 B1 7/2003 Adair et al.
6,599,273 B1 7/2003 Lopez
6,610,040 B1 8/2003 Fowles et al.
6,629,958 B1 10/2003 Spinello
6,656,433 B2 12/2003 Sasso
6,715,520 B2 4/2004 Andreasson et al.
6,814,726 B1 11/2004 Lauer
6,852,103 B2 2/2005 Fowles et al.
6,875,203 B1 4/2005 Fowles et al.
6,875,205 B2 4/2005 Leinsing
6,911,025 B2 6/2005 Miyahara
6,997,917 B2 2/2006 Niedospial, Jr. et al.
7,040,598 B2 5/2006 Raybuck
7,083,605 B2 8/2006 Miyahara
7,097,209 B2 8/2006 Unger et al.
7,261,707 B2 8/2007 Frezza et al.
7,306,584 B2 12/2007 Wessman et al.
7,326,194 B2 2/2008 Zinger et al.
7,350,535 B2 4/2008 Liepold et al.
7,354,427 B2 4/2008 Fangrow
7,452,349 B2 11/2008 Miyahara
7,547,300 B2 6/2009 Fangrow
7,628,772 B2 12/2009 McConnell et al.
7,648,491 B2 1/2010 Rogers
7,658,734 B2 2/2010 Adair et al.
7,743,799 B2 6/2010 Mosler et al.
7,744,581 B2 6/2010 Wallen et al.
7,758,560 B2 7/2010 Connell et al.
7,803,140 B2 9/2010 Fangrow, Jr.
7,857,805 B2 12/2010 Raines
7,867,215 B2 1/2011 Akerlund et al.
7,879,018 B2 2/2011 Zinger et al.
7,900,659 B2 3/2011 Whitley et al.
7,927,316 B2 4/2011 Proulx et al.
7,942,860 B2 5/2011 Horppu
7,975,733 B2 7/2011 Horppu et al.
8,096,525 B2 1/2012 Ryan
8,122,923 B2 2/2012 Kraus et al.
8,123,738 B2 2/2012 Vaillancourt
8,137,332 B2 3/2012 Pipelka
8,167,863 B2 5/2012 Yow
8,177,768 B2 5/2012 Leinsing
8,196,614 B2 6/2012 Kriheli
8,206,367 B2 6/2012 Warren et al.
8,211,069 B2 7/2012 Fangrow, Jr.
8,225,826 B2 7/2012 Horppu et al.
8,226,628 B2 7/2012 Muramatsu et al.
8,257,286 B2 9/2012 Meyer et al.
8,267,127 B2 9/2012 Kriheli
8,277,424 B2 10/2012 Pan
8,317,741 B2 11/2012 Kraushaar
8,317,743 B2 11/2012 Denenburg
8,398,607 B2 3/2013 Fangrow, Jr.
8,403,905 B2 3/2013 Yow
8,425,487 B2 4/2013 Beiriger et al.
8,449,521 B2 5/2013 Thorne, Jr. et al.
8,454,579 B2 6/2013 Fangrow, Jr.
8,968,271 B2 3/2015 Guala
8,985,162 B2 3/2015 Aneas
9,132,062 B2 9/2015 Fangrow
9,468,586 B2 10/2016 Kvale
9,510,997 B2 12/2016 Kriheli et al.
9,724,269 B2 8/2017 Sjogren et al.
9,808,401 B2 11/2017 Ishiwata et al.
2003/0070726 A1 4/2003 Andreasson et al.
2005/0065495 A1 3/2005 Zambaux
2005/0182383 A1 8/2005 Wallen
2005/0215976 A1 9/2005 Wallen
2006/0089593 A1 4/2006 Landau et al.
2006/0178638 A1 8/2006 Reynolds
2007/0079894 A1 4/2007 Kraus et al.
2008/0009789 A1 1/2008 Zinger et al.
2008/0045919 A1 2/2008 Jakob et al.
2008/0287914 A1 11/2008 Wyatt et al.
2009/0159485 A1 6/2009 Jakob et al.
2010/0106129 A1 4/2010 Goeckner et al.
2010/0168638 A1 7/2010 Korogi et al.
2010/0179506 A1 7/2010 Shemesh et al.
2010/0217226 A1 8/2010 Shemesh
2011/0004183 A1 1/2011 Carrez et al.
2011/0062703 A1 3/2011 Lopez et al.
2011/0074148 A1 3/2011 Imai
2011/0106046 A1 5/2011 Hiranuma et al.
2011/0257621 A1 10/2011 Fangrow
2011/0284561 A1 11/2011 Rosenquist et al.
2011/0291406 A1 12/2011 Kraft et al.
2012/0035580 A1 2/2012 Fangrow
2012/0046636 A1 2/2012 Kriheli
2012/0053555 A1 3/2012 Ariagno et al.
2012/0123381 A1 5/2012 Kraus et al.
2012/0192968 A1 8/2012 Bonnal et al.
2012/0192976 A1 8/2012 Rahimy et al.
2012/0203193 A1 8/2012 Rogers
2012/0265163 A1 10/2012 Cheng et al.
2012/0279884 A1 11/2012 Tennican et al.
2012/0296307 A1 11/2012 Holt et al.
2012/0316536 A1 12/2012 Carrez et al.
2013/0006211 A1 1/2013 Takemoto
2013/0012908 A1 1/2013 Yeung
2013/0066293 A1 3/2013 Garfield et al.
2013/0072893 A1* 3/2013 Takemoto .......... A61M 39/1011
604/403
2013/0076019 A1 3/2013 Takemoto
2013/0079744 A1 3/2013 Okiyama et al.
2013/0167841 A1 7/2013 Sheffer et al.
2013/0274679 A1 10/2013 Jugl et al.
2013/0303994 A1 11/2013 Gaillot et al.
2014/0000738 A1 1/2014 Reynolds et al.
2014/0150925 A1 6/2014 Sjogren et al.
2014/0171875 A1 6/2014 Poncon
2014/0352845 A1 12/2014 Lev et al.
2015/0297454 A1 10/2015 Sanders et al.
2015/0297459 A1 10/2015 Sanders
2015/0297839 A1 10/2015 Sanders et al.

(56) References Cited

U.S. PATENT DOCUMENTS

| | | | |
|---|---|---|---|
| 2015/0297881 | A1 | 10/2015 | Sanders et al. |
| 2016/0058667 | A1 | 3/2016 | Kriheli |
| 2016/0361504 | A1 | 12/2016 | Kim et al. |

FOREIGN PATENT DOCUMENTS

| | | | |
|---|---|---|---|
| EP | 2719420 | A1 | 4/2014 |
| WO | 0128490 | A1 | 4/2001 |
| WO | 2005011781 | A1 | 2/2005 |
| WO | 2006052655 | A2 | 5/2006 |
| WO | 2006058435 | A2 | 6/2006 |
| WO | 2006103074 | A1 | 10/2006 |
| WO | 2008136720 | A1 | 11/2008 |
| WO | 2009024807 | A1 | 2/2009 |
| WO | 2009090627 | A1 | 7/2009 |
| WO | 2011050333 | A1 | 4/2011 |
| WO | 2011146012 | A1 | 11/2011 |
| WO | 2011150037 | A1 | 12/2011 |
| WO | 2012069401 | A1 | 5/2012 |
| WO | 2012119225 | A1 | 9/2012 |
| WO | 2012168235 | A1 | 12/2012 |
| WO | 2013025946 | A1 | 2/2013 |
| WO | 2013115730 | A1 | 2/2013 |
| WO | 2013054323 | A1 | 4/2013 |
| WO | 2013066779 | A1 | 5/2013 |
| WO | 2013179596 | A1 | 12/2013 |
| WO | 2014122643 | A1 | 8/2014 |
| WO | 2014181320 | A1 | 11/2014 |

* cited by examiner

FLUID TRANSFER DEVICE AND PACKAGING THEREFOR

CROSS-REFERENCE TO RELATED APPLICATION

This application is a continuation of U.S. patent application Ser. No. 15/982,114, filed May 17, 2018, which is a continuation of U.S. patent application Ser. No. 14/691,845, filed Apr. 21, 2015 (now U.S. Pat. No. 9,999,570), which claims priority to U.S. Provisional Application Ser. No. 61/982,049, filed Apr. 21, 2014, each of which are hereby incorporated by reference in their entirety.

BACKGROUND OF THE INVENTION

Field of the Invention

The present invention relates to a fluid transfer device for a closed transfer of fluid from a medical device to a patient delivery device, such as an IV line or syringe. More specifically, the invention is directed to a fluid transfer device and packaging therefor configured for engaging/disengaging a connection element on the fluid transfer device using the packaging.

Description of Related Art

Healthcare workers, such as pharmacists and nurses, can be subject to acute and long term health risks upon repeated exposure to drugs or solvents which might escape into the air during drug preparation, drug administration, and other similar handling. This problem is particularly serious when cytotoxins, antiviral drugs, antibiotics, and radiopharmaceuticals are concerned. The health risks faced by exposure to these drugs can include the development of cancer, reproductive problems, genetic conditions, and other serious concerns. Other hazardous areas may be sample taking, such as samples concerning virus infections or the like. When performing infusions, it is often necessary to inject a drug or other medical substance into the infusion fluid, inside an infusion bag or other infusion fluid container. This is often done by means of penetrating a septum or other fluid barrier of an injection port on the infusion bag or on the infusion fluid line with a needle of a syringe filled with the medical fluid in question. However, even before this, it may be necessary to transfer the medical fluid from a vial to a syringe and then from the syringe to a secondary container. In each of these steps, staff may be exposed to the medical fluid by means of contamination. Such contamination may be vaporized medical fluid or aerosol in the air. The contaminations may contaminate the staff through their lungs, or by vaporized medical fluid or aerosol in the air which condensates on the skin to thereafter penetrate the skin of the staff. Some medicaments are even known to penetrate protection gloves and thereby contaminate the staff.

Exposure to contaminations like this may, on a long term basis, give rise to alarmingly high concentrations of medicaments in the blood or the human body of the staff as described above. It has been understood that, due to the many transferring steps between containers e.g., vials, syringes, infusion systems, etc., the risk for contamination during the actual insertion and retraction of a needle from the container, e.g., a vial, needs to be contained. Closed system transfer devices (CSTDs) have been developed to ensure that the medicament is contained in the transfer device during transfer of the medicament.

Generally, a CSTD includes an adapter for connection to a syringe and an adapter for connection to a vial, a second syringe, or a conduit providing fluid access to the patient's circulatory system. According to one arrangement, the healthcare practitioner may reconstitute a powdered or lyophilized compound with saline or some other reconstitution medium by attaching the syringe to the vial via connection of the respective adapters, reconstituting the drug, aspirating the compound into the syringe, disconnecting the adapters, and then attaching the syringe to the fluid conduit through the respective adapters to a patient delivery device, such as an IV line or syringe for administration to the patient.

One type of an adapter that can be used in a CSTD has a first connector having a male or female luer-lock element that is arranged to be joined with a corresponding female or male luer-lock element of a second connector component. According to one aspect, the second connector component can be a patient delivery device, such as an IV line or a syringe. The luer-lock element can, thus, be screwed into and unscrewed from the corresponding luer-lock element. It is desirable to prevent an accidental or inadvertent unscrewing of the components, which could lead to the disconnection of the fluid passage. Such disconnection may entail a serious contamination risk for a patient and/or any other person in the vicinity of the disconnected medical connector. The issue of safety in administration of hazardous medical compounds is one that has been identified as being of critical importance by professional organizations and government agencies alike.

It is, therefore, desirable to provide an adapter for enabling fluid transfer between the first connector and the second connector by facilitating a positive connection of the connectors and avoiding inadvertent or accidental disconnection of the connectors.

SUMMARY OF THE INVENTION

According to one aspect, a fluid transfer system may include a container and a connector. The container may include a tubular body having a sidewall extending between an open top end and a bottom end along a central axis to define an interior cavity. At least one protrusion may be aligned with the central axis and extend from an interior portion of the sidewall into the interior cavity. The connector may be configured for being received within the interior cavity of the container. The connector may include a body having a distal end, a proximal end, and a generally cylindrical sidewall extending between the distal end and the proximal end and defining a fluid passageway therethrough. An inner member may be provided at one of the distal end and the proximal end of the body, such that the inner member is configured to cooperate with a patient delivery device to provide fluid communication between the body and the patient delivery device. Additionally, an outer member may surround at least a portion of the inner member, such that the inner member is configured to rotate freely relative to the outer member. A locking arrangement may be provided on at least a portion of the inner member and be accessible through at least a portion of the outer member. The locking arrangement may be configured for cooperating with the at least one protrusion to prevent rotation of the inner member relative to the outer member.

The locking arrangement may be configured to engage the at least one protrusion to prevent rotation of the inner member relative to the outer member upon an application of a compressive force on the container.

In accordance with another aspect, the at least one protrusion may include a pair of protrusions oriented opposite from each other around a circumference of the container. The container may further include a pair of tabs extending radially outward from an outer portion of the sidewall opposite the protrusions. The protrusions may be configured to deflect radially inward in response to the compressive force directed to the tabs. The sidewall of the container may be inclined relative to the central axis such that the sidewall narrows radially inward from the open top end to the closed bottom end. The at least one protrusion may be substantially parallel to the central axis of the container.

In accordance with a further aspect, the connector may include at least one window recessed within the body of the connector in a longitudinal direction of the connector. The at least one window may be configured to receive the at least one protrusion of the container when the connector is inserted into the interior cavity to prevent rotation of the connector relative to the container. Each window may extend through the sidewall of the connector such that, when deflected by the compressive force, the at least one protrusion engages the locking mechanism to prevent rotation of the inner member relative to the outer member of the connector. The locking arrangement may include at least one tooth extending from an engagement surface of the locking arrangement. The engagement surface of the locking arrangement may be engaged by the at least one protrusion upon the application of the compressive force. The inner member may include a luer-lock fitting.

In accordance with yet another aspect, a container may be configured for engaging/disengaging a connector with a patient delivery device. The container may include a tubular body having a sidewall extending between an open top end and a bottom end along a central axis to define an interior cavity configured for receiving the connector therein. At least one protrusion may be aligned with the central axis and extend from an interior portion of the sidewall into the interior cavity. The at least one protrusion may be configured for aligning the connector and preventing rotation of the connector relative to the container. At least one tab may extend radially outward from an outer portion of the sidewall opposite the at least one protrusion. The at least one protrusion may be configured to deflect radially inward in response to a compressive force directed to the tab and engage a locking arrangement of the connector. The at least one protrusion may include a pair of protrusions oriented opposite from each other around a circumference of the container. The sidewall of the container may be inclined relative to the central axis such that the sidewall narrows radially inward from the open top end to the closed bottom end. The at least one protrusion may be substantially parallel to the central axis of the container.

In another aspect, a connection device may be configured for engaging/disengaging a connector with a patient delivery device. The connection device may have a flexible body having an arcuate shape, at least one tab provided on one end of the body, and an engagement structure provided on the at least one tab. The engagement structure may be configured for engaging a locking arrangement on the connector to prevent rotation of an inner member of the connector relative to an outer member of the connector upon the application of a compressive force on the at least one tab. The at least one tab may further include a finger engagement surface. The at least one tab may be connected to a flexible joint.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of “a”, “an”, and “the” include plural referents unless the context clearly dictates otherwise.

DESCRIPTION OF THE INVENTION

Figure 1A:
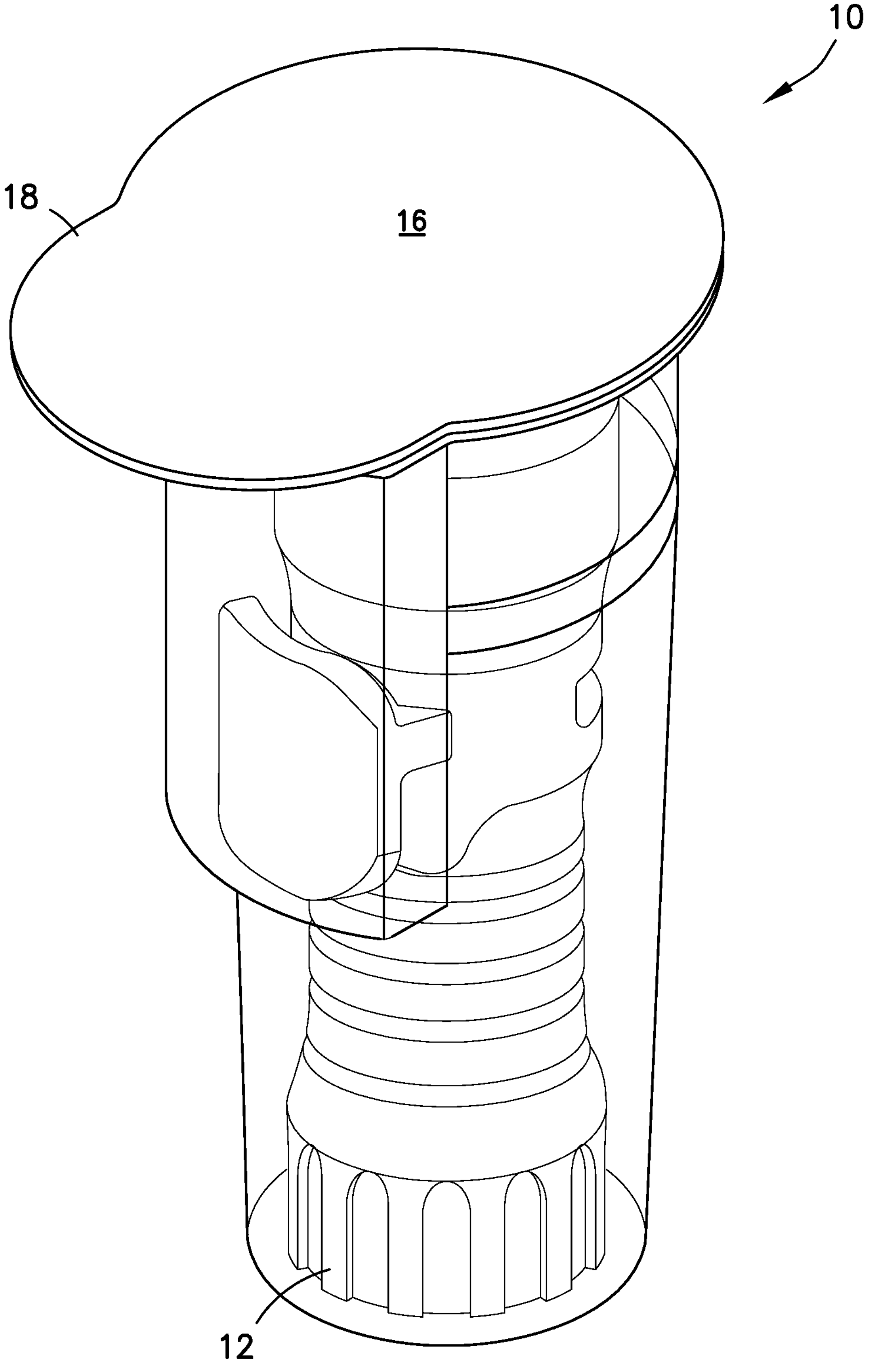
FIG. 1A is a perspective view of a container and a connector in accordance with an aspect of the present invention.
Figure 1B:
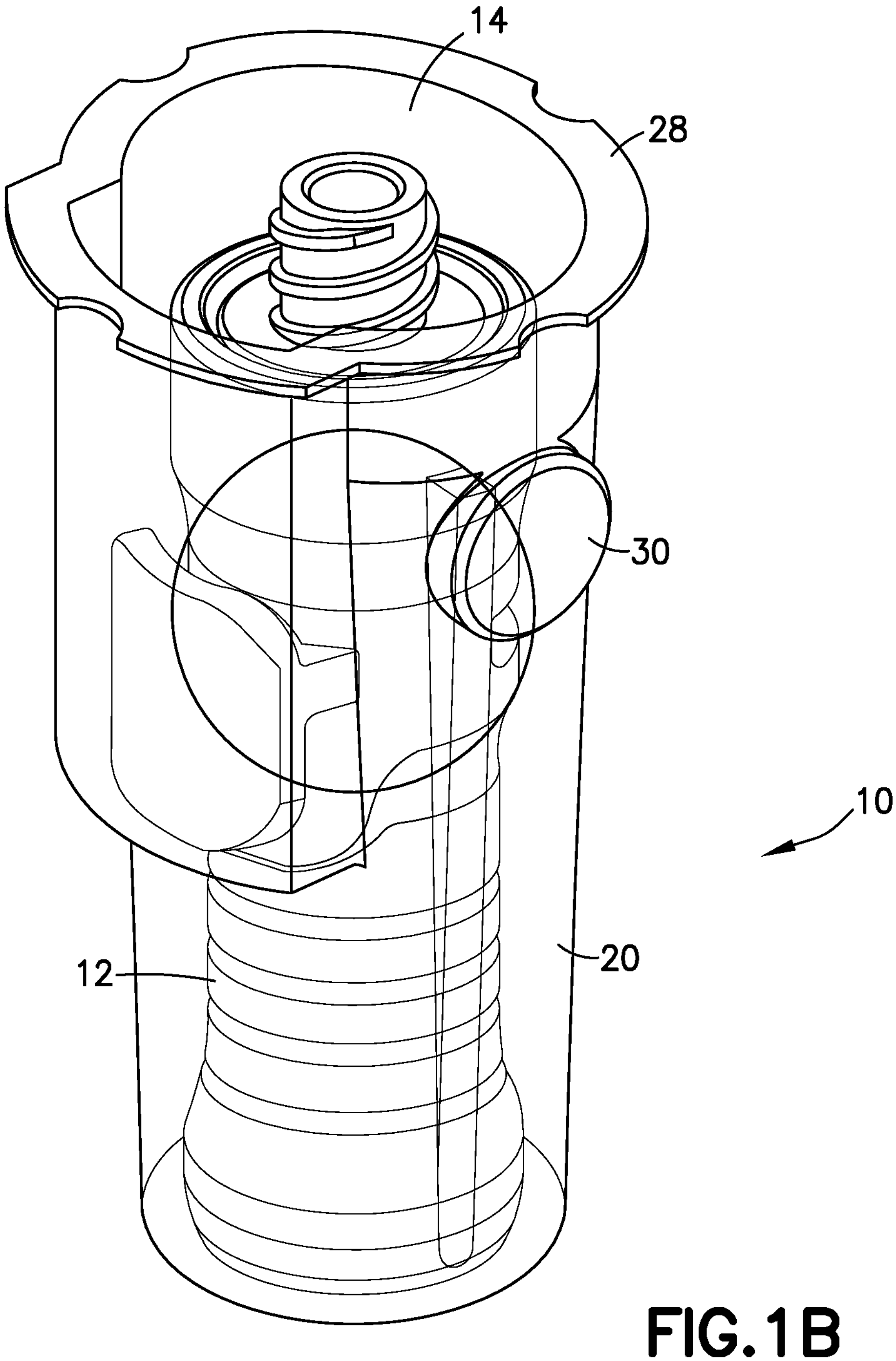
FIG. 1B is a perspective view of a container shown with a cap removed from the container.

The illustrations generally show preferred and non-limiting aspects of the systems and methods of the present disclosure. While the descriptions present various aspects of the devices, it should not be interpreted in any way as limiting the disclosure. Furthermore, modifications, concepts, and applications of the disclosure’s aspects are to be interpreted by those skilled in the art as being encompassed by, but not limited to, the illustrations and descriptions herein.

Further, for purposes of the description hereinafter, the terms “end”, “upper”, “lower”, “right”, “left”, “vertical”, “horizontal”, “top”, “bottom”, “lateral”, “longitudinal”, and derivatives thereof shall relate to the disclosure as it is oriented in the drawing figures. The term “proximal” refers to the direction toward the center or central region of the device. The term "distal" refers to the outward direction extending away from the central region of the device. However, it is to be understood that the disclosure may assume various alternative variations and step sequences, except where expressly specified to the contrary. It is also to be understood that the specific devices and processes illustrated in the attached drawings, and described in the following specification, are simply exemplary aspects of the disclosure. Hence, specific dimensions and other physical characteristics related to the aspects disclosed herein are not to be considered as limiting. For the purpose of facilitating understanding of the disclosure, the accompanying drawings and description illustrate preferred aspects thereof, from which the disclosure, various aspects of its structures, construction and method of operation, and many advantages may be understood and appreciated.

With reference to FIGS. 1A-1D, a container, generally indicated as 10, is shown in accordance with one aspect of the invention. The container 10 is generally configured as a vessel capable of receiving and housing a medical connector, generally indicated as 12, which can be used as part of a CSTD. The connector 12 is desirably disposed entirely within an interior cavity 14 (shown in FIG. 1B) of the container 10. The container 10 and the connector 12 have correspondingly shaped features to facilitate the insertion and removal of the connector 12 into and from the container 10, as will be described in greater detail hereinafter.

A cap 16 (shown in FIG. 1A) is provided to enclose the interior cavity 14 of the container 10. The cap 16 may be in the form of a membrane that provides a seal with the container to prevent contaminants from entering the interior cavity 14. Desirably, the cap 16 is removable from the container 10 such that the interior cavity 14 may be accessed once the cap 16 is removed. The cap 16 and the container 10 may be separate components or formed together as a combined structure. A security feature (not shown) may be provided on the cap 16 or the container 10 to indicate an attempt to remove the cap 16 and access the interior cavity 14. Optionally, the cap 16, once removed, can be replaced on the container 10 to reclose the interior cavity 14. In one aspect, the cap 16 may be connected to the container 10 by a connection element (not shown). The cap 16 has a tab 18 configured for being gripped by a user's fingers to facilitate removal of the cap 16.

Figure 2A:
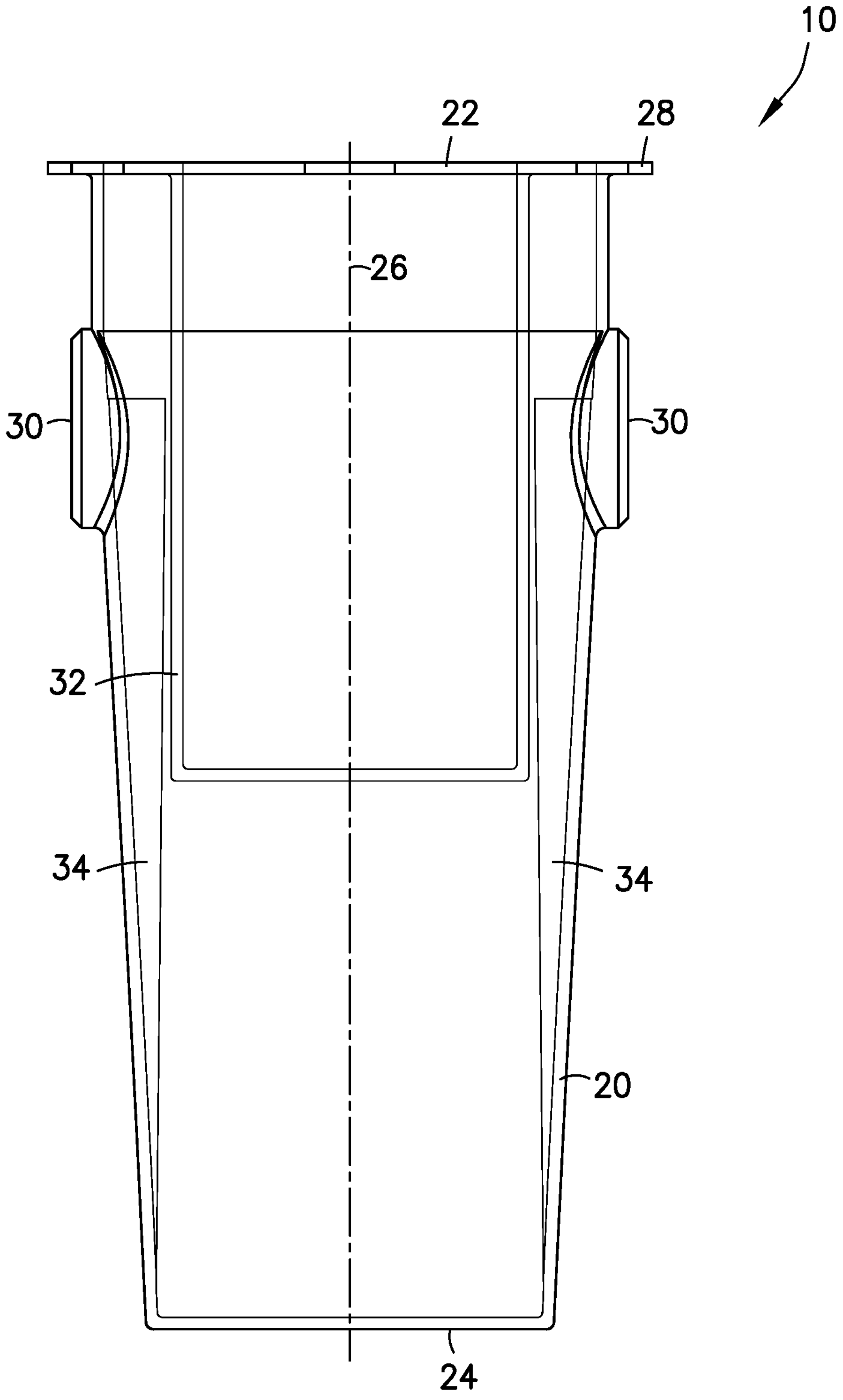
FIG. 2A is front view of the container of FIG. 1B shown with the connector removed from the container.
Figure 2B:
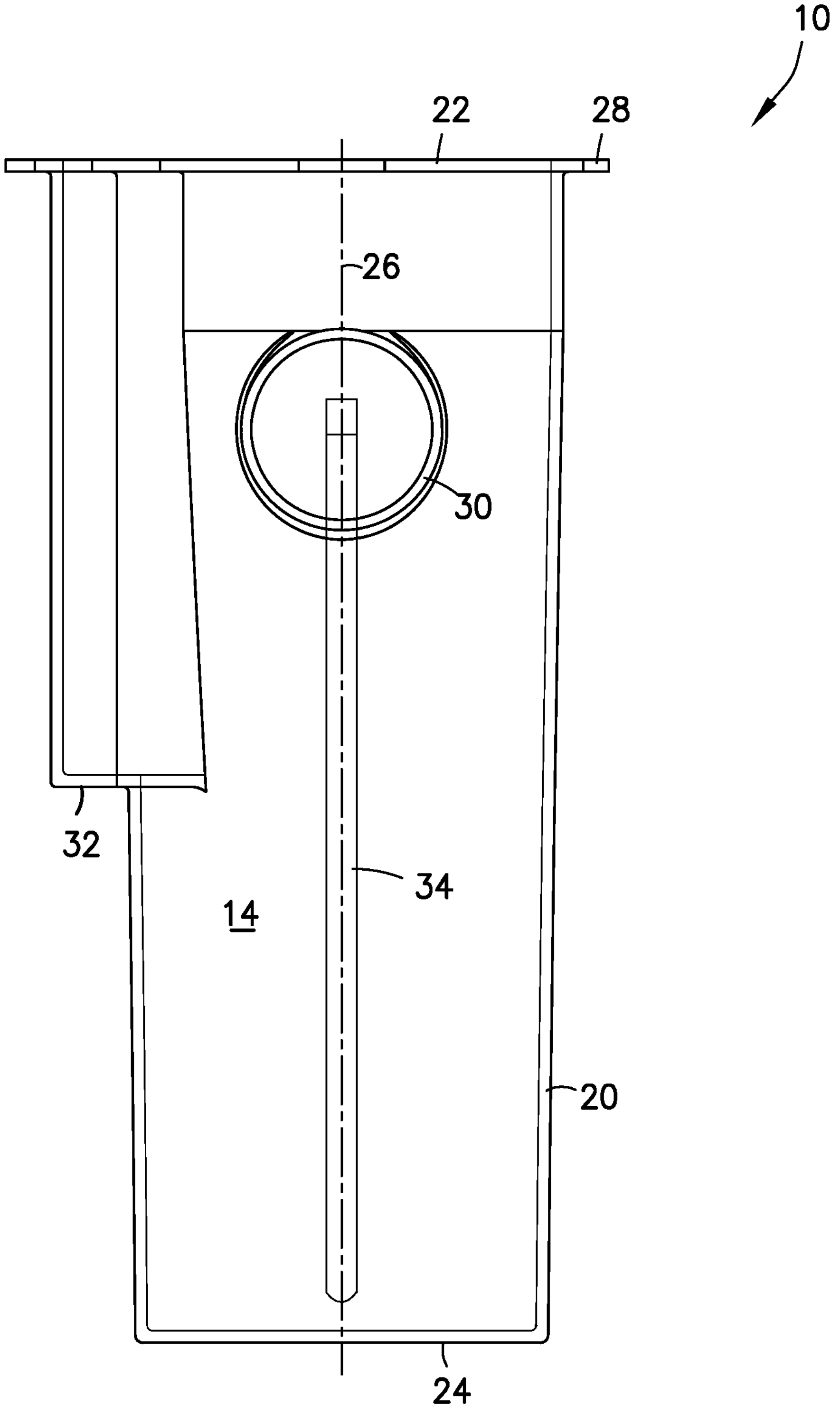
FIG. 2B is a side view of the container of FIG. 2A.

With reference to FIGS. 2A-2B, the container 10 is a generally tubular body having a sidewall 20 defining an open top end 22 and a closed bottom end 24. The sidewall 20 extends continuously between the open top end 22 and the closed bottom end 24 along a central axis 26 to define the interior cavity 14. The sidewall 20 may be inclined relative to the central axis 26 such that the container 10 has a substantially conical shape that narrows radially inward from the open top end 22 to the closed bottom end 24. Alternatively, the sidewall is substantially parallel relative to the central axis 26 such that the container 10 has a substantially cylindrical shape.

The container 10 is sealed at the top end 22 by the cap 16. A lip 28 extends radially outward from the open top end 22 relative to the central axis 26. The lip 28 provides an interface for the engagement of the cap 16 with the container 10. The closed bottom end 24 may have a substantially flattened shape to enable the container 10 to be supported when the closed bottom end 24 is placed on a level surface. Alternatively, the closed bottom end 24 may have a rounded or arcuate shape, or a shape configured to correspond to a bottom end of the connector 12. The container 10 may be constructed from any known material, such as a molded, injected, or thermo-formed plastic material. Desirably, the container 10 is constructed from a material that provides flexibility of the sidewall 20 in at least the radial direction with respect to the central axis 26. In particular, the container 10 is desirably constructed from a material that allows the cross-sectional shape of the container 10 to change with an application of a radially-directed force, as will be described in greater detail hereinafter.

Figure 2C:
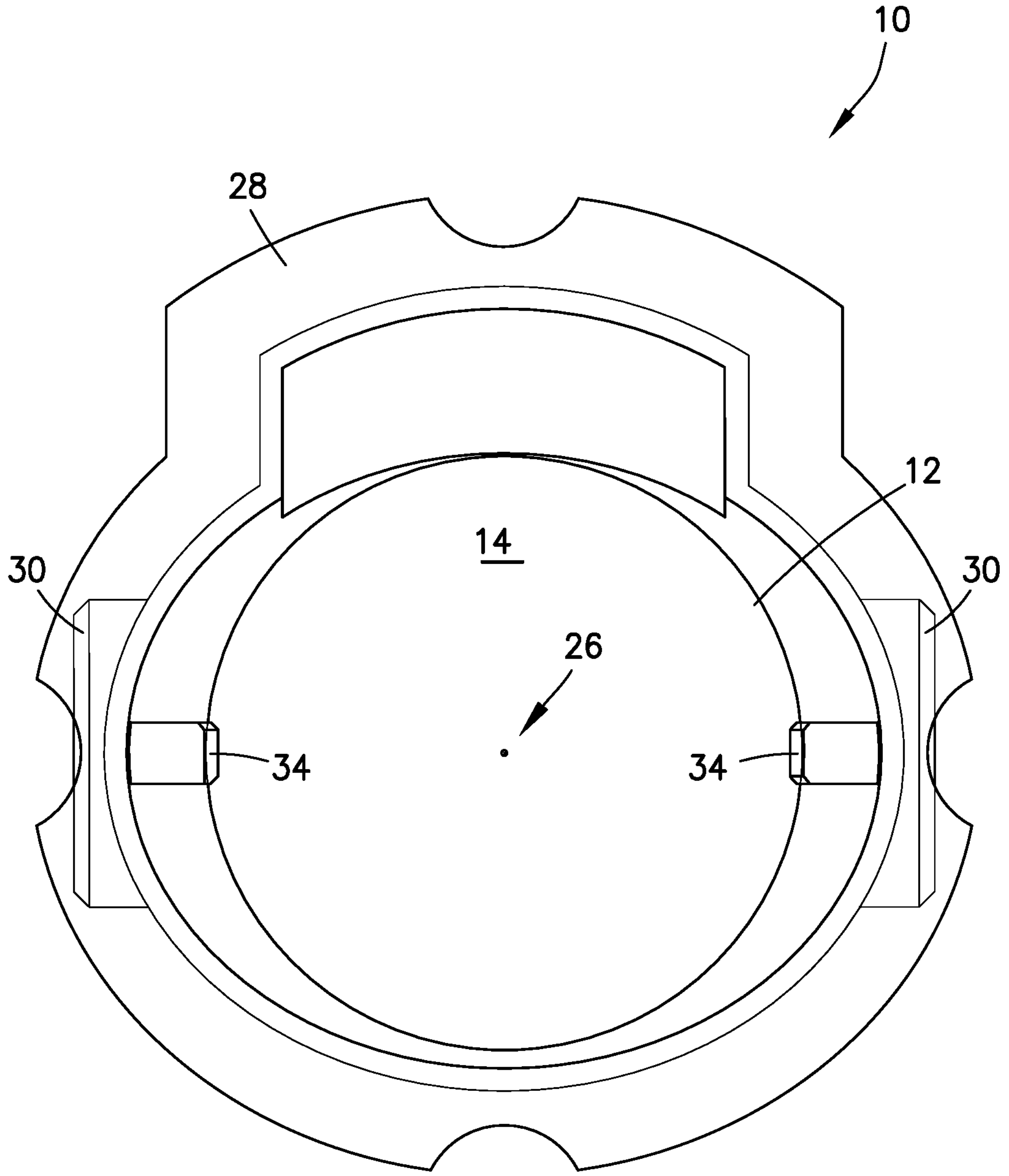
FIG. 2C is a top view of the container of FIG. 2A.

With reference to FIGS. 2A-2C, the container 10 has a pair of tabs 30 on an outer portion of the sidewall 20. The tabs 30 extend radially outward from the sidewall 20 relative to the central axis 26. In one aspect, each tab 30 may be in the form of a substantially cylindrical projection that extends radially outward in a direction substantially perpendicular to the central axis 26. As shown in FIGS. 2A and 2C, the tabs 30 may be oriented 180 degrees apart around a circumference of the container 10. As will be described hereinafter, the tabs 30 define a gripping surface by which the container 10 may be gripped. The container 10 is configured to deflect radially inward in response to a radially-directed force imparted on the tabs 30. The tabs 30 may be hollow, such that the sidewall 20 has a uniform thickness throughout the longitudinal length of the container 10. Alternatively, the tabs 30 may be solid, such that the sidewall 20 has an increased thickness in the region of the tabs 30.

With specific reference to FIG. 2B, the container 10 further includes a recess 32 that is configured for receiving an activation tab of the connector 12, as will be described hereinafter. The recess 32 extends radially outward relative to the central axis 26. The recess 32 also extends along at least a portion of the longitudinal length of the container 10. The recess 32 is shaped such that the sidewall 20 bulges radially outward in the area of the recess 32. In addition to accommodating the activation tab of the connector 12, the recess 32 also orients the connector 12 such that it can be received in the interior cavity 14 in one direction only. In this manner, the connector 12 is aligned with the tabs 30 and the recess 32. Other features of the container 10 or the connector 12 may be used to align the connector 12 within the interior cavity 14 of the container 10.

With specific reference to FIG. 2A, a pair of longitudinal protrusions 34 extend radially inward from the sidewall 20 inside the interior cavity 14. The protrusions 34 extend in a direction substantially parallel to the central axis 26. In certain aspects, the protrusions 34 may be angled relative to the central axis 26. The protrusions 34 may have any desired shape, including, but not limited to, square, rectangular, rounded, etc. In one aspect, the protrusions 34 extend from a region of the inner sidewall 20 proximate to the closed bottom end 24 to an area of the inner sidewall 20 opposite the tabs 30. In an aspect where the sidewall 20 tapers outward from the closed bottom end 24 to the open top end 22, such as shown in FIG. 2A, the protrusions 34 may have a first surface that is parallel and coextensive with the tapering sidewall 20 and a second surface that is parallel to the central axis 26 and offset, at least in part, from the sidewall 20. In an alternative aspect where the sidewall 20 is parallel with the central axis 26, the protrusions 34 may have a first surface that is parallel and coextensive with the sidewall 20 and a second surface that is parallel and offset from the sidewall 20. As shown in FIGS. 2A and 2C, the protrusions 34 may be oriented 180 degrees apart around a circumference of the container 10 such that each protrusion 34 is aligned with the corresponding tab 30. For example, the longitudinal midpoint of each protrusion 34 may be aligned with an axis extending through the center of each tab

30. As will be described hereinafter, the protrusions 34 define an alignment feature for aligning the connector 12 within the interior cavity 14 of the container 10. In addition, the protrusions 34 interact with a corresponding slot on the connector 12 to prevent a rotation of the connector 12 within the container 10. As will be described in greater detail hereinafter, the protrusions 34 are configured to deflect radially inward in response to a radially-directed force imparted on the tabs 30. While FIGS. 2A-2C illustrate a pair of protrusions 34 separated equally about the circumference of the container 10, it is to be appreciated that more than two protrusions 34 may be provided with equal or unequal separation about the circumference of the container 10. However, at least one protrusion 34 is provided on an inner sidewall 20 opposite a single tab 30.

Figure 1C:
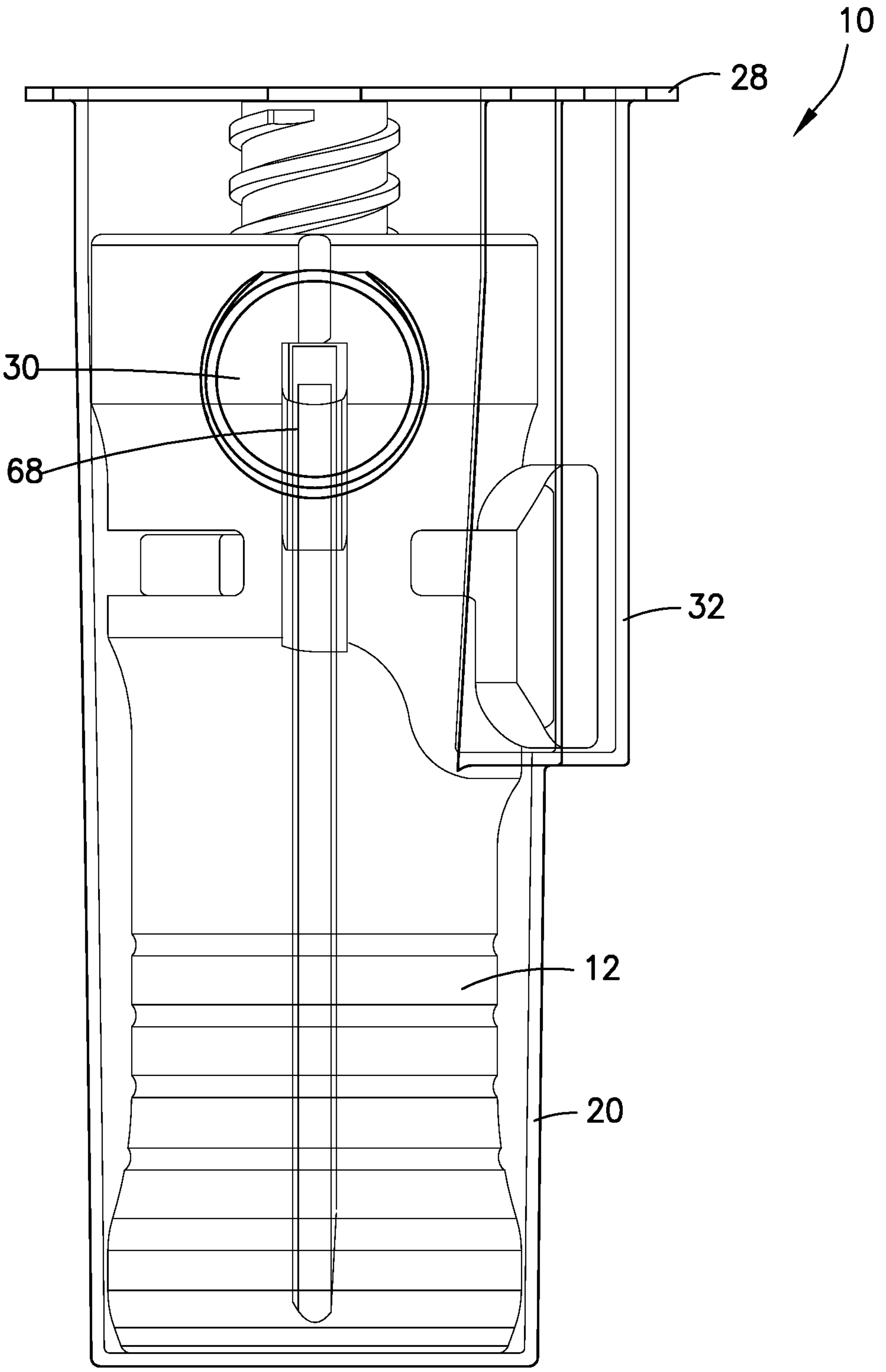
FIG. 1C is a side view of the container of FIG. 1B.
Figure 1D:
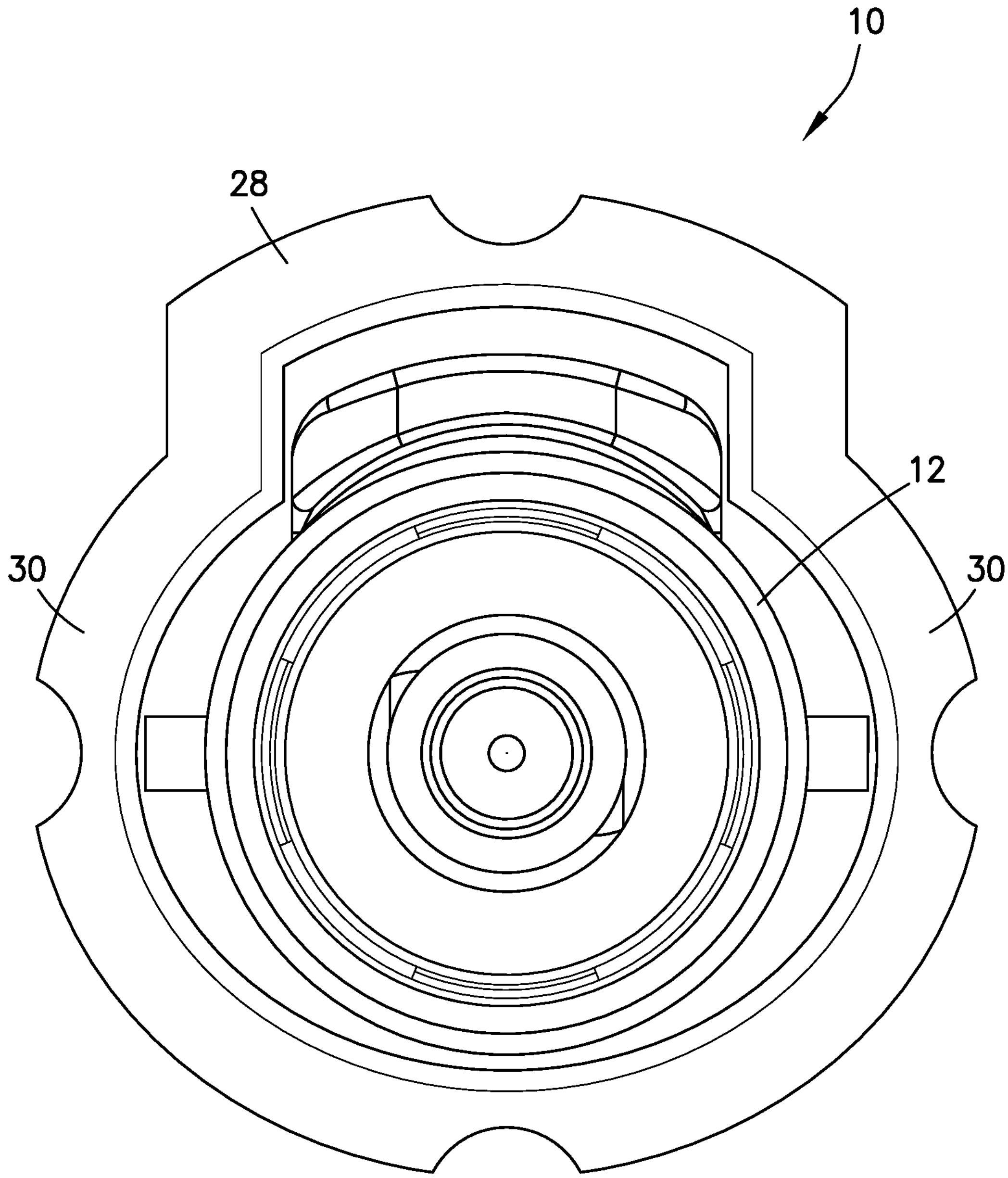
FIG. 1D is a top view of the container of FIG. 1B.
Figure 3A:
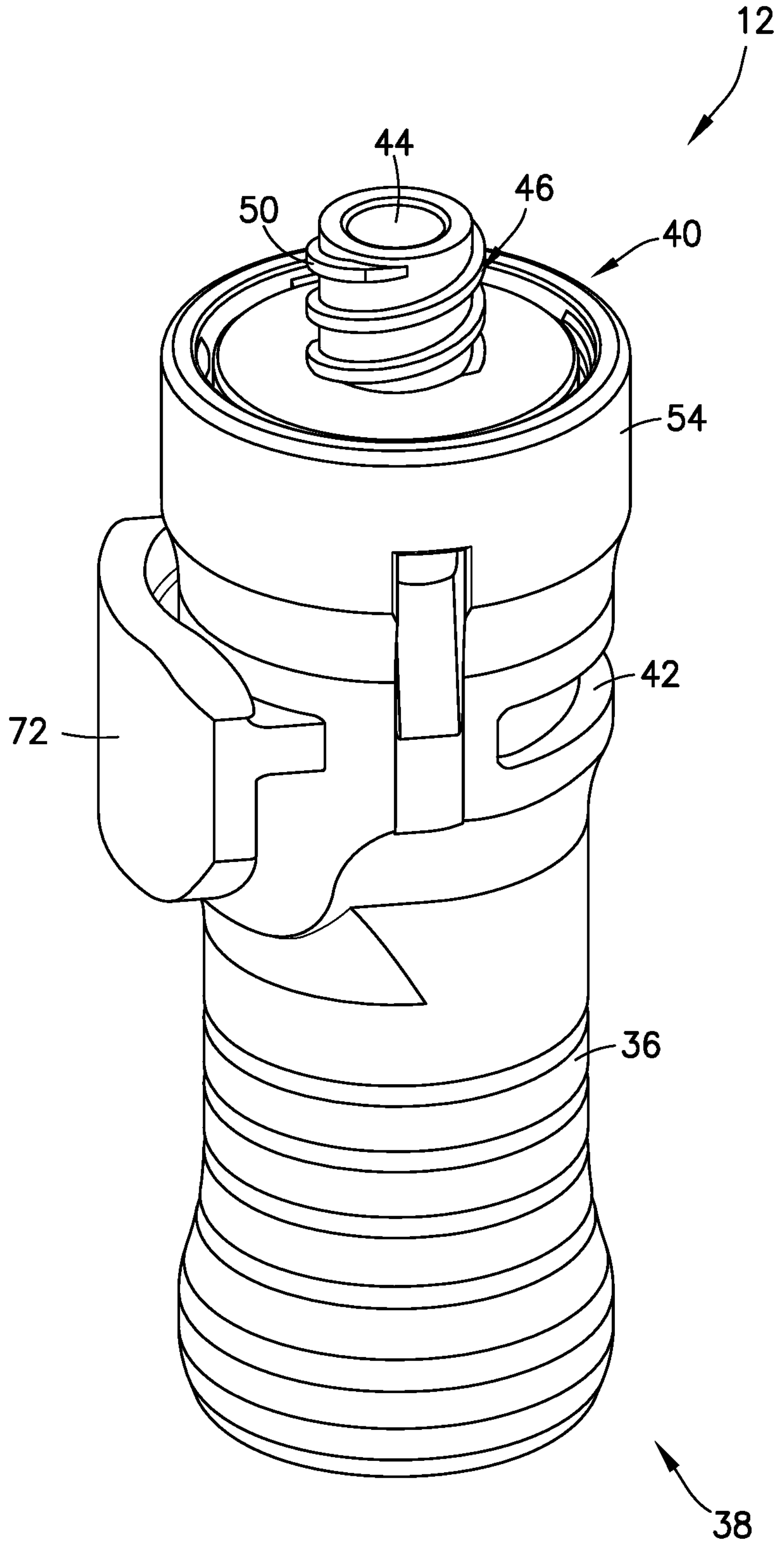
FIG. 3A is perspective view of the connector of FIG. 1A shown without the container.
Figure 3B:
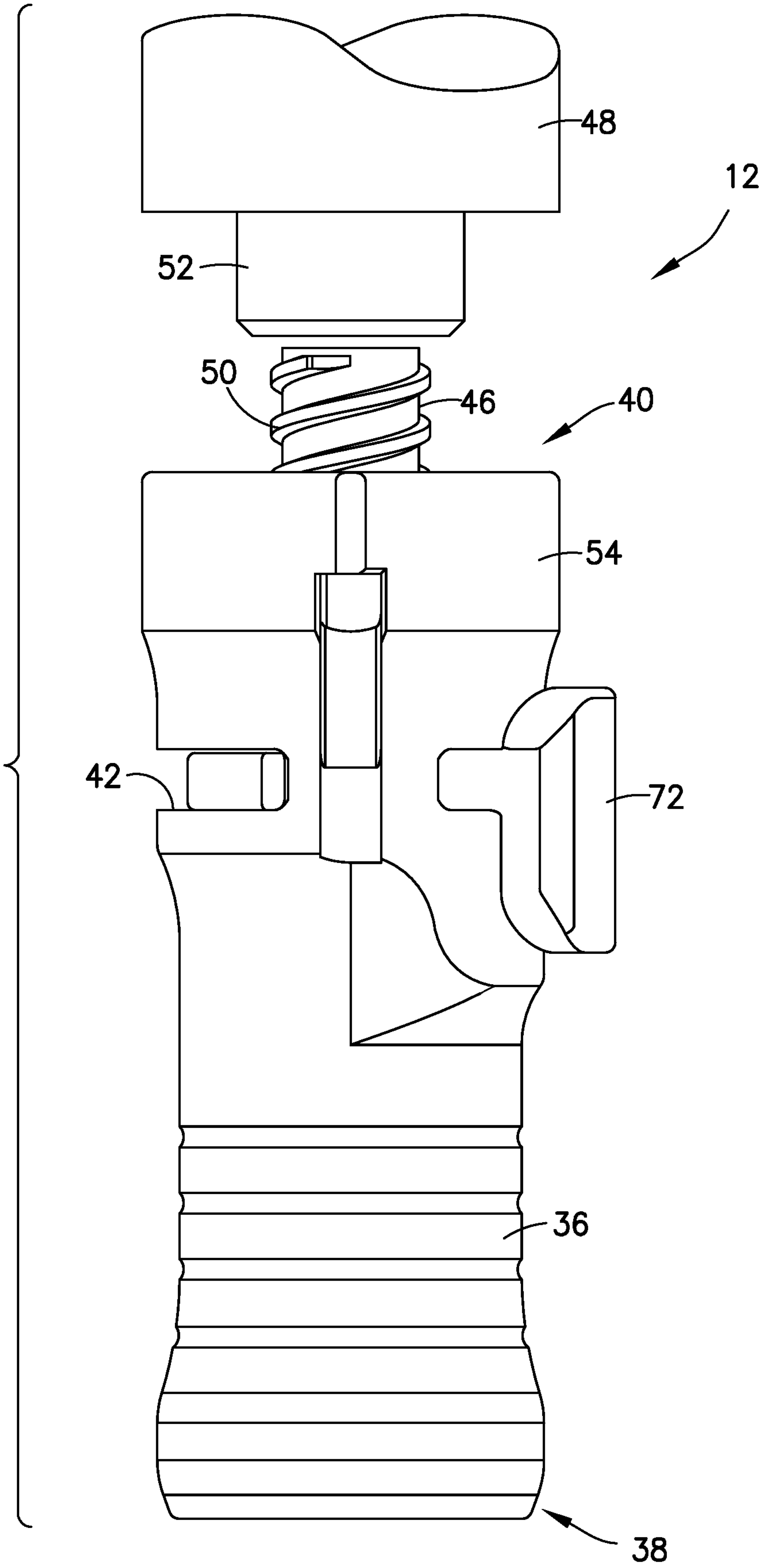
FIG. 3B is a side view of the connector of FIG. 3A.

With reference to FIGS. 3A-3B, the connector 12 is an assembly of components adapted to create a tamper-proof connection interface between the connector 12 and a medical device or component, including, but not limited to, a vial, fluid bag, syringe, or patient fluid line. The connector 12 is configured to prevent accidental or inadvertent disconnection of the connector 12 and the medical device or component, which could compromise the integrity of the CSTD. The connector 12 is desirably disposed entirely within the interior cavity 14 (shown in FIG. 1B) of the container 10. The container 10 and the connector 12 have correspondingly shaped features to facilitate the insertion and removal of the connector 12 into and from the container 10. The connector 12 has a body 36, having a distal end 38, a proximal end 40, and a generally cylindrical sidewall 42 extending between the distal end 38 and the proximal end 40 and defining a fluid passageway 44 therethrough (shown in FIG. 3A). An activation tab 72 is provided on the body 36 for connecting and/or disconnecting the connector 12 from a medical device or component. The activation tab 72 extends radially outward from the sidewall 42. Desirably, the activation tab 72 is shaped to be received within a recess 32 provided on the container 10, as shown in FIG. 1C. Other features of the connector 12 may be used to align the connector 12 within the container 10 such that the container 10 is aligned relative to the protrusions 34.

With continuing reference to FIGS. 3A-3B, the connector 12 includes an inner member 46 located at the proximal end 40 of the body 36. The inner member 46 provides a connection interface with a patient delivery device 48, such as a syringe or an IV line (shown in FIG. 3B). It can be appreciated that depending upon the orientation of the connector 12 with respect to the patient delivery device 48, the connection interface can be considered to be located at the distal end 38 of the body 36. The inner member 46 is configured to cooperate with the patient delivery device 48 to provide fluid communication via the fluid passageway 44 between the connector 12 and the patient delivery device 48. The inner member 46, as shown in FIGS. 3A-3D, has a luer-lock connector 50, which is configured for cooperating with a corresponding luer connection 52 (shown in FIG. 3B) on the patient delivery device 48. While FIGS. 3A-3D illustrate the luer-lock connector 50 as a male connector, the luer-lock connector 50 may be embodied as a female connector configured for connecting to a male connector on the corresponding luer connection 52 on the patient delivery device 48. Alternatively, the luer-lock connector 50 can be embodied as any other mating connection configured for coupling with the patient delivery device 48.

Figure 3C:
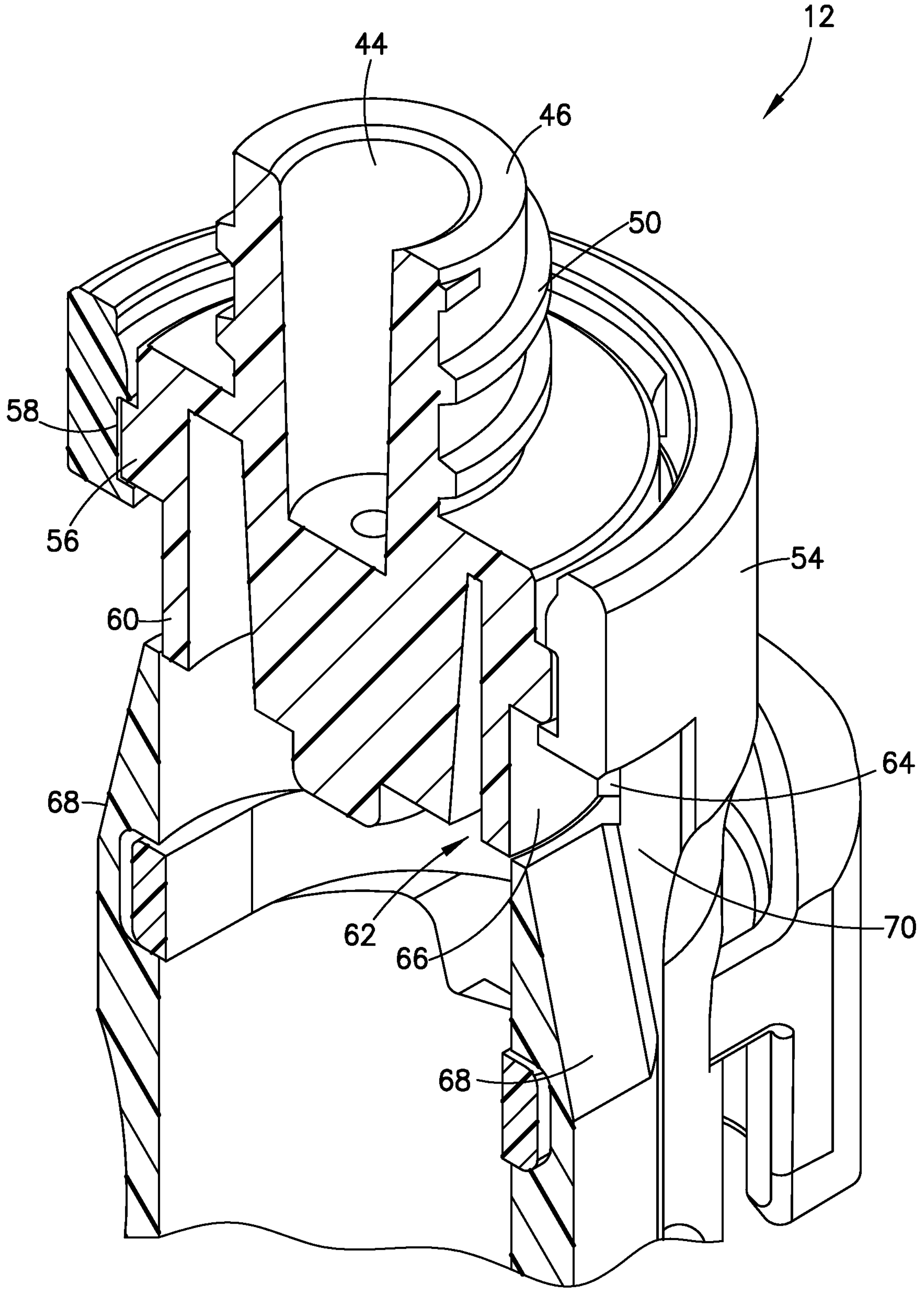
FIG. 3C is a cross-sectional view of the connector of FIG. 3A.

With reference to FIG. 3C, an outer member 54 surrounds at least a portion of the inner member 46. A radial extension 56 of the inner member 46 is received within an annular sleeve 58 on the outer member 54 such that the inner member 46 is configured to rotate freely with respect to the outer member 54 and with respect to the patient delivery device 48. Once the patient delivery device 48 is connected to the inner member 46, the freely rotating state prevents inadvertent and/or accidental disconnection of the patient delivery device 48 from the inner member 46, as the application of rotational force to the patient delivery device 48 will cause the inner member 46 to rotate with the rotation of the patient delivery device 48 without applying the rotational force necessary to remove the patient delivery device 48 from the inner member 46. It can be appreciated that the connector 12 of the present invention and/or the connection interface of the present invention is not limited for use with a patient delivery device 48 but can be used in association with other components in a CSTD or other medical devices.

Figure 3D:
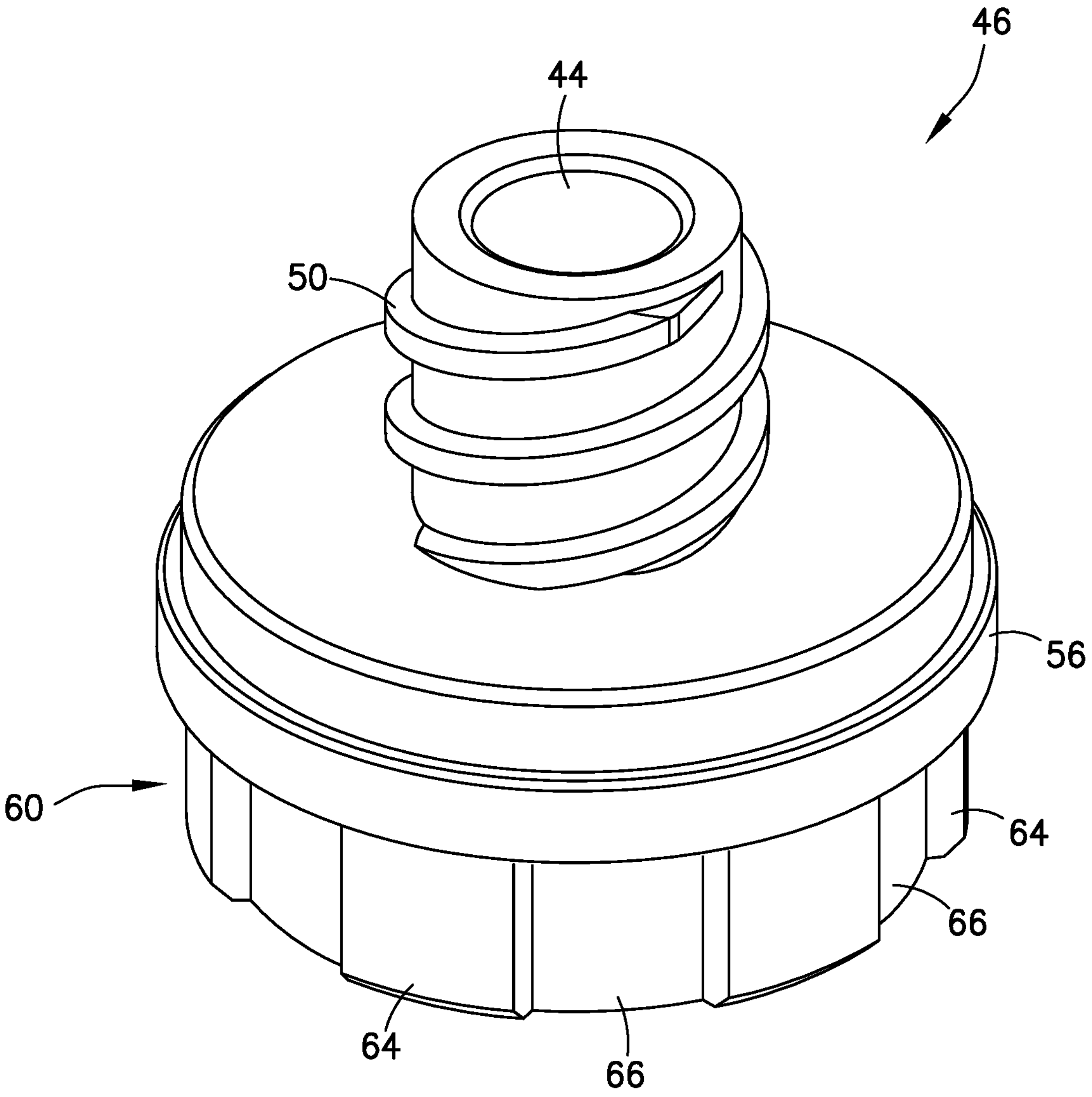
FIG. 3D is a perspective view of an inner member of the connector of FIG. 3A.
Figure 4A:
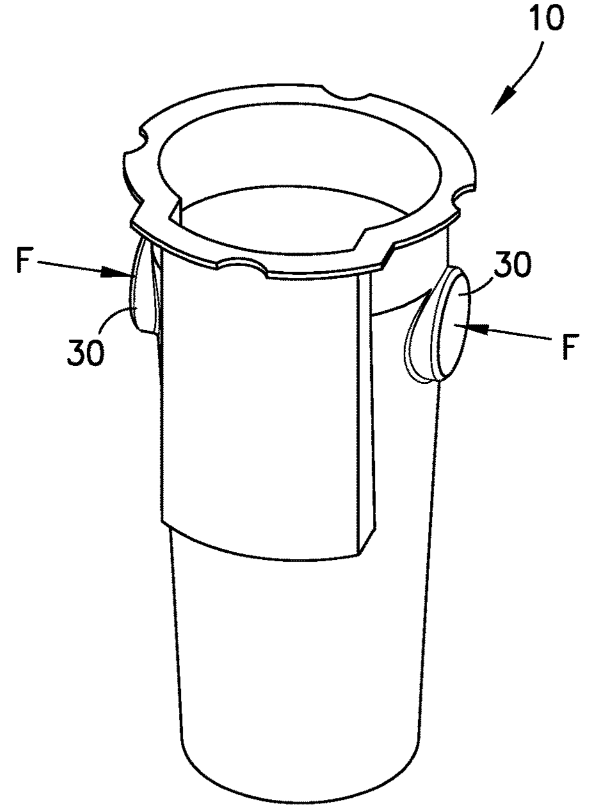
FIG. 4A is a perspective view of the container of FIG. 2A shown in an initial state prior to the application of a radially-directed force.
Figure 4B:
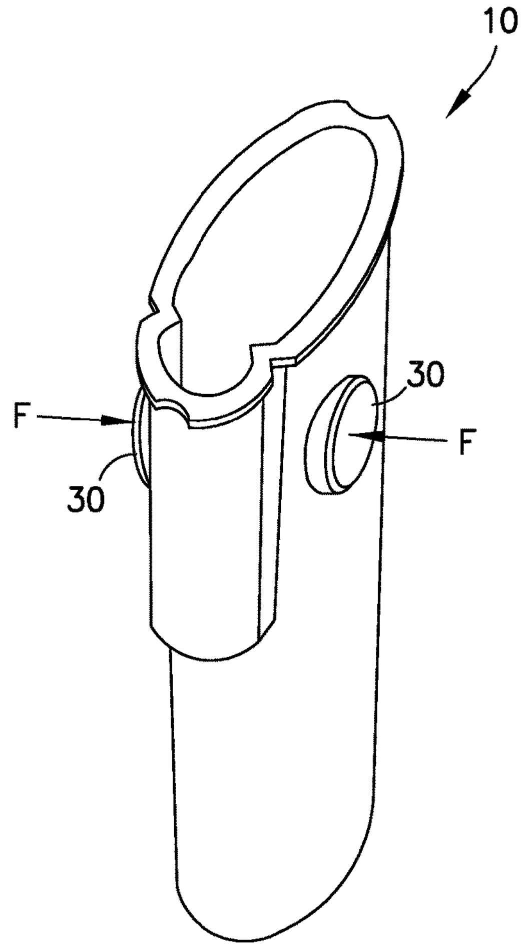
FIG. 4B is a perspective view of the container of FIG. 4A in a state after the application of the radially-directed force.
Figure 4C:
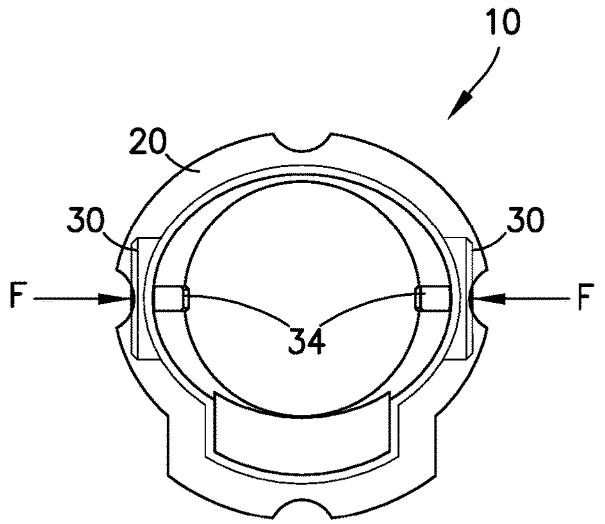
FIG. 4C is a top view of the container of FIG. 4A.
Figure 4D:
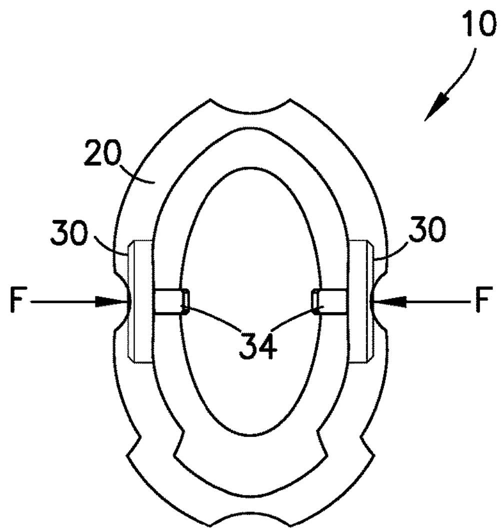
FIG. 4D is a top view of the container of FIG. 4B.

With reference to FIG. 3D, and with continuing reference to FIG. 3C, the inner member 46 has an annular skirt 60 extending distally from the radial extension 56. The annular skirt 60 is recessed relative to the radial extension 56. The annular skirt 60 has a locking arrangement 62 configured to prevent free rotation of the inner member 46 relative to the outer member 54 to enable connection of the inner member 46 to and/or disconnection of the inner member 46 from the patient delivery device 48. The locking arrangement, generally indicated as 62, is configured to be engaged by the protrusions 34 of the container 10 upon the application of a compressive force F, shown in FIGS. 4A-4C. By engaging the locking arrangement 62, the inner member 46 is locked relative to the outer member 54, such that an axial or rotational force can be applied to the interface between the inner member 46 and the patient delivery device 48 to attach or detach the connector 12 from the patient delivery device 48.

According to one aspect, as shown in FIGS. 3C and 3D, the locking arrangement 62 can include a plurality of teeth 64 extending from an outer surface of the annular skirt 60. The teeth 64 are spaced radially about the circumference of the annular skirt 60 at equal intervals. In another aspect, the teeth 64 may be spaced with unequal intervals about the circumference of the annular skirt 60. The teeth 64 are configured to clear the inner surface of the outer member 54 during rotation of the inner member 46 relative to the outer member 54. The teeth 64 are separated by a plurality of engagement surfaces 66 extending therebetween. The teeth 64 are generally concealed by the outer member 54 of the body 36. It can be appreciated that other locking arrangements can be provided that enable locking of the inner and outer members 46, 54 with respect to one another upon the engagement of the locking arrangement. For example, a single tooth 64 may be provided on the annular skirt 60. Alternatively, the engagement surface 66 may provide a frictional interface with the inner member 46 to prevent the rotation of the inner member 46. The surface finish, coating, and material of the engagement surface 66 and the inner member 46 may be optimized for achieving the desired frictional conditions for proper functioning of the locking arrangement 62. The engagement surface 66 is configured to be engaged by the protrusions 34 of the container 10 upon the application of a compressive force F, shown in FIG. 5. By engaging the engagement surface 66, a protrusion 34 is disposed between two adjacent teeth 64 such that the inner member 46 is locked relative to the outer member 54. In this manner, an axial or rotational force can be applied to the interface between the inner member 46 and the patient delivery device 48 to attach or detach the connector 12 to or from the patient delivery device 48.

With reference to FIG. 3C, a pair of slots 68 is provided on the outer member 54 of the body 36; however, a single slot 68 may be provided in alternative aspects. The slots 68 extend between the distal end 38 and the proximal end 40 over at least a portion of the longitudinal length of the body 36. At least a portion of the slots 68 extends through the sidewall 42 of the connector 12 to define a window 70 for accessing an interior portion of the connector 12. Specifically, the window 70 defined by the slots 68 is configured to provide access to the locking arrangement 62. In other aspects, the window 70 may be provided separately from the slots 68. In addition, in an aspect where the activation tab 72 is used to align the connector 12 within the container 10, the slots 68 need not be provided.

With continued reference to FIG. 3C, the slots 68 may be oriented 180 degrees apart around a circumference of the connector 12 such that each slot 68 is aligned with the corresponding tab 30 (FIG. 1C). For example, the longitudinal midpoint of each slot 68 may be aligned with an axis extending through the center of each tab 30. The slots 68 define an alignment feature for aligning the connector 12 with the protrusions 34 of the container 10. In particular, the slots 68 are shaped to receive the protrusions 34 such that the connector 12 is guided by the protrusions 34 as the connector 12 is inserted in or removed from the container 10. In an uncompressed state of the container 10, the protrusions 34 are not biased against the locking arrangement 62. While FIG. 3C illustrates a pair of slots 68 separated equally about the circumference of the connector 12, it is to be appreciated that more than two slots 68 may be provided with equal or unequal separation about the circumference of the connector 12. However, at least one slot 68 is provided in alignment with at least one of the protrusions 34 and the tabs 30 when the connector 12 is inserted in the container 10. In various aspects, the number of slots 68 need not correspond to the number of protrusions 34.

With reference to FIGS. 4A-4D, the application of the compressive force F in a radial direction causes the container to be compressed radially in a direction of the force F. Specifically, by applying the force F on the tabs 30, the container 10 is locally compressed such that the portions of the sidewall 20 proximate to the tabs 30 are compressed towards each other. In this manner, the protrusions 34 are also biased toward one another such that the distance between the opposing protrusions 34 is reduced when the compressive force F is applied to the tabs 30. In an aspect where a single protrusion 34 is provided, the compressive force F causes the protrusion 34 to be biased toward an inner sidewall of the container 10 opposite the protrusion 34 such that the distance between the protrusion 34 and the opposing sidewall is reduced when the compressive force F is applied to the tabs 30. The structure of the container 10 of the present invention is such that it requires the deliberate action of applying a radially-directed compressive force F on the tabs 30 to cause the protrusions 34 to be biased against the locking arrangement 62 in order to prevent rotational movement of the inner member 46 relative to the outer member 54, and thereby permit tightening or loosening of the patient delivery device 48 by the application of a rotational force thereto.

Figure 5:
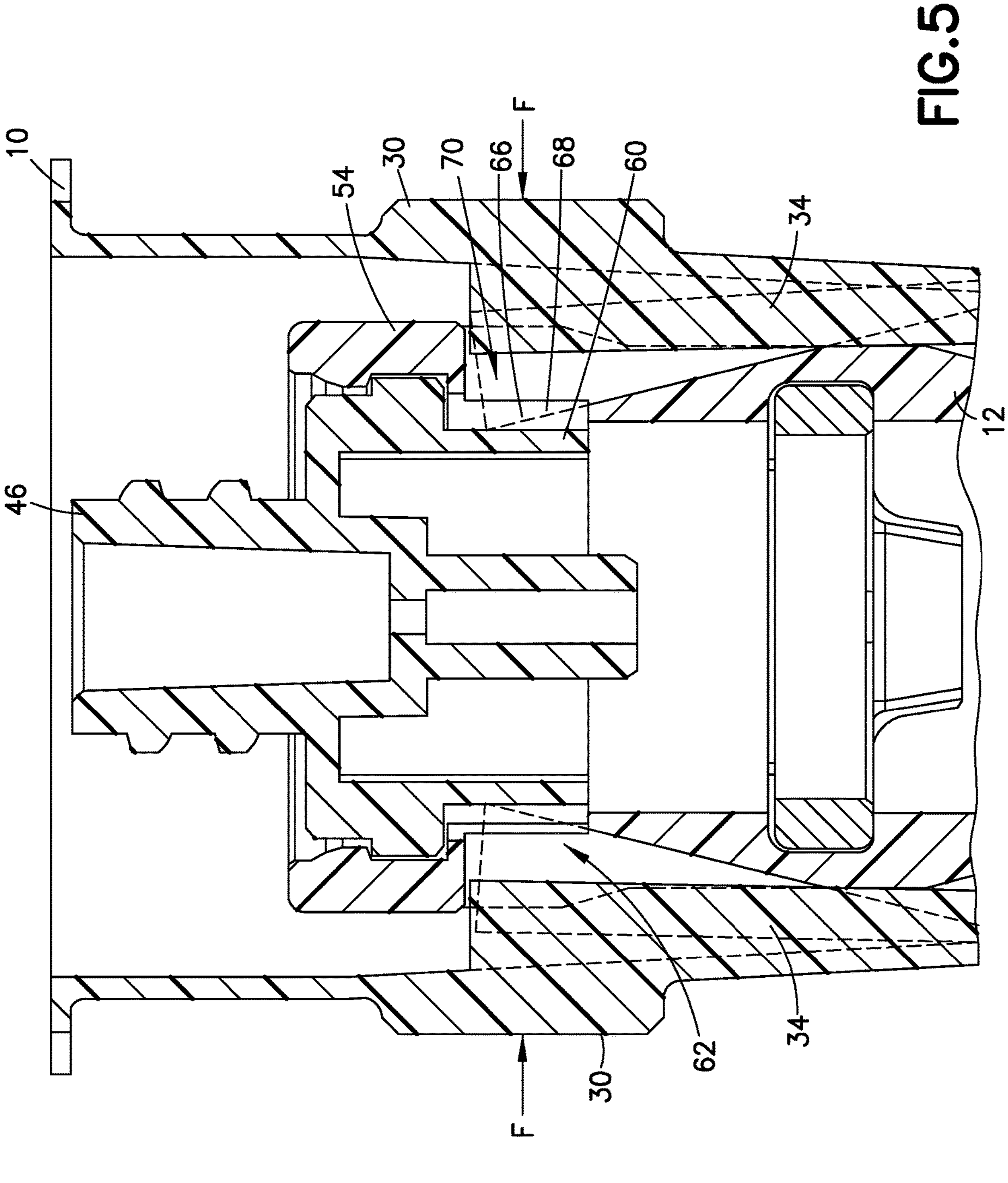
FIG. 5 is a cross-sectional view of an engagement region between a container and a connector in accordance with one aspect of the present invention.

With reference to FIG. 5, as the protrusions 34 are biased toward one another from an initial, uncompressed state (indicated by solid lines) to a compressed state (indicated by dashed lines) due to an application of a radially-directed compressive force F on the tabs 30, the protrusions 34 engage the locking arrangement 62 by extending through the window 70 of the slots 68. In this manner, the protrusions 34 engage the annular skirt 60 of the inner member 46. In particular, the protrusions 34 engage the engagement surface 66 of the annular skirt 60 in a region between the teeth 64. In another aspect, a frictional interface between the protrusions 34 and the engagement surface 66 may be created as a result of an application of a radially-directed compressive force F on the tabs 30. By maintaining the force F, the protrusions 34 are biased against the engagement surface 66 to prevent the rotation of the inner member 46 relative to the outer member 54. Engagement of the locking arrangement 62 by the protrusions 34 causes the inner member 46 to be locked relative to the outer member 54, such that an axial or rotational force can be applied to the interface between the inner member 46 and the patient delivery device 48 to attach or detach the connector 12 to or from the patient delivery device 48. By releasing the force F, the container 10 reverts to its original shape, where the relative distance between the protrusions 34 is increased such that the protrusions 34 are disengaged from the locking arrangement 62 and the inner member 46 can rotate freely relative to the outer member 54, thereby preventing inadvertent or accidental removal of the patient delivery device 48 from the inner member 46.

Having described the structure of the container 10 and the connector 12 disposed therein, a method of securing the connector 12 to the patient delivery device 48 using the container 10 will now be described. The method includes providing the container 10 and the connector 12, as described hereinabove. Desirably, the connector 12 is disposed entirely within the container 10 and sealed by the cap 16. After removing the cap 16, a radially-directed compressive force F is applied to the tabs 30 of the container 10, thereby causing compression of the container 10 and biasing of the protrusions 34 of the container 10 toward one another. The method further includes the engagement of the protrusions 34 with the locking arrangement 62 due to the radial deflection of the protrusions 34. As the protrusions 34 are deflected radially, the protrusions 34 are advanced through the window 70 and biased into engagement with the engagement surface 66 of the locking arrangement 62. Such engagement prevents free rotation of the inner member 46 relative to the outer member 54, thereby allowing the connection between the patient delivery device 48 and the inner member 46 of the connector 12. Although the protrusions 34 prevent rotation of the connector 12 within the container 10 while the patient delivery device 48 is secured to the inner member 46, any other portion of the connector 12 may interface with the container 10 to prevent relative rotation between the container 10 and the connector 12. In particular, the activation tab 72 of the connector 12 is received within the recess 32 of the container 10, which acts to prevent relative rotation between the container 10 and the connector 12 when the connector 12 is positioned within the container 10.

Upon release of the compressive force F, the protrusions 34 of the container 10 are disengaged from the locking arrangement 62 to permit free rotation of the inner member 46 relative to the outer member 54, thereby preventing inadvertent and/or accidental disconnection of the inner member 46 from the patient delivery device 48. The method can also include the re-application of the compressive force F to cause the locking arrangement 62 to be re-engaged for removal of the patient delivery device 48 from the connector 12.

Figure 6A:
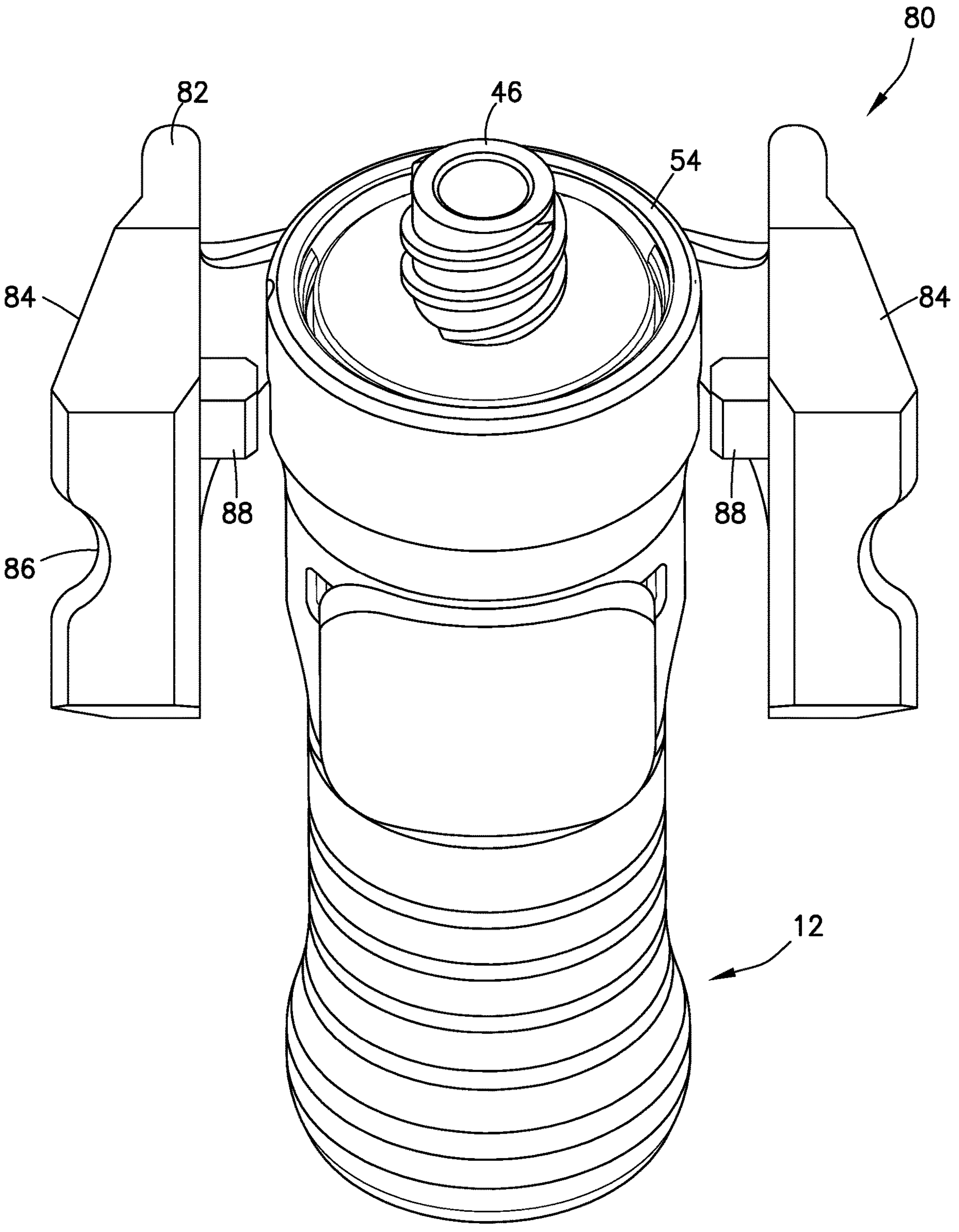
FIG. 6A is a perspective view of a connector with a connection device in accordance with an aspect of the present invention.
Figure 6B:
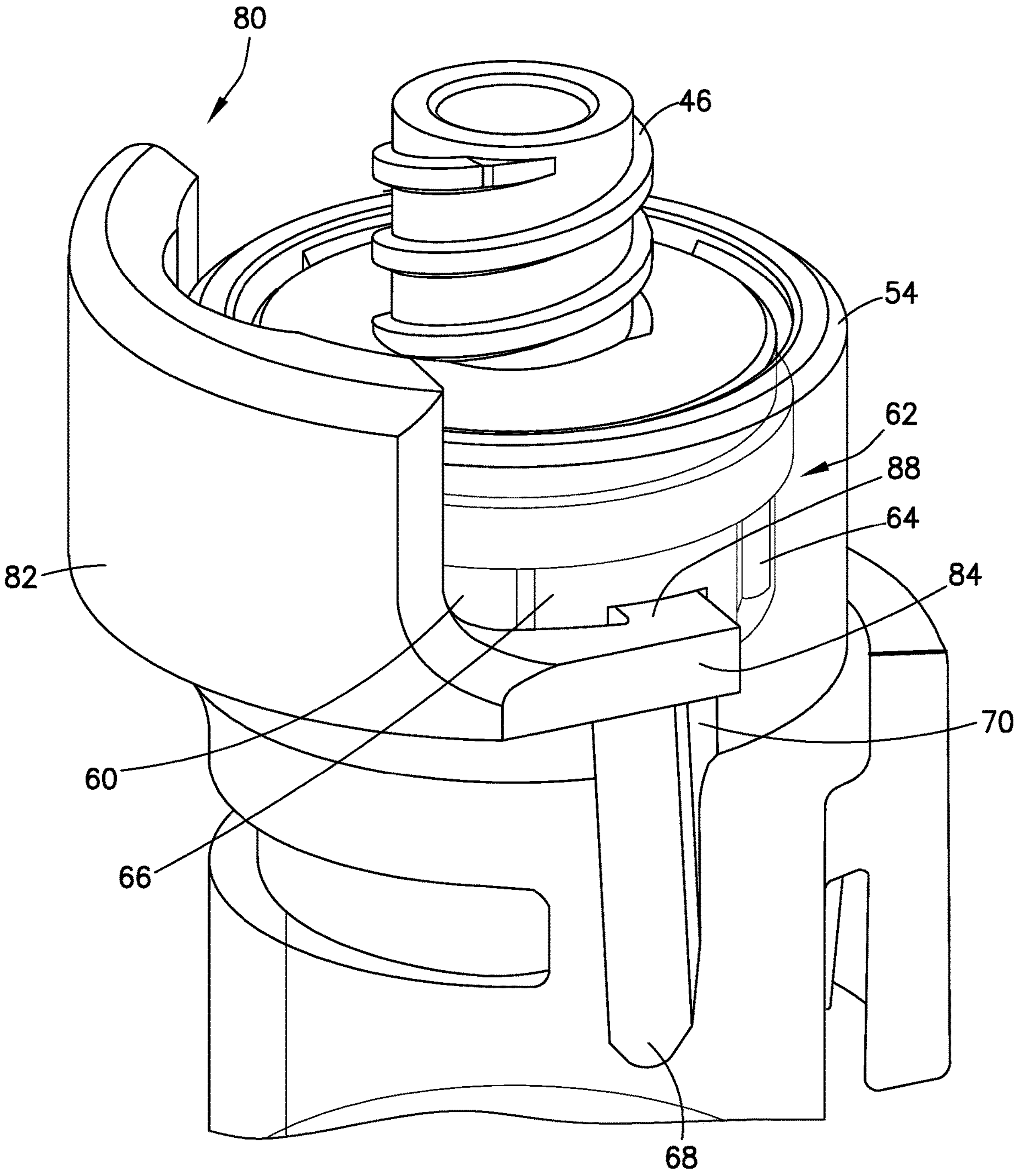
FIG. 6B is a detailed perspective view of the connector with the connection device of FIG. 6A.
Figure 6C:
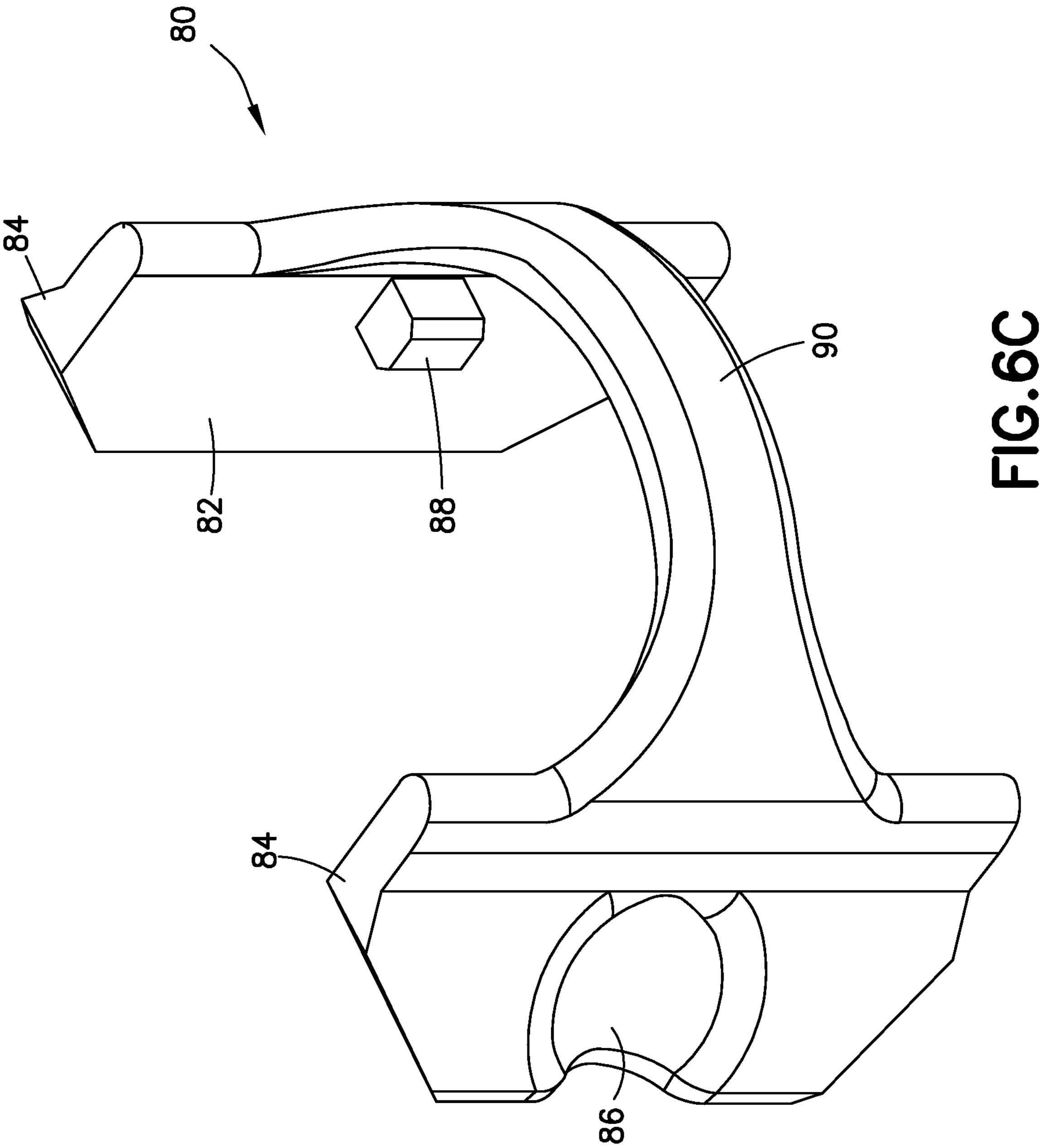
FIG. 6C is a perspective view of the connection device of FIG. 6A.

With reference to FIGS. 6A-6C, a connection device 80 is shown in use with the connector 12 described hereinabove.

The connection device 80 is configured for engaging the locking arrangement 62 on the connector 12 to prevent relative movement between the inner member 46 and the outer member 54. With reference to FIG. 6C, the connection device 80 has a substantially arcuate shape configured for enveloping a portion of the connector 12. In one aspect, the connection device 80 envelops a portion of the circumference of the outer member 54. The connection device 80 has a flexible body 82 with a pair of tabs 84 located at opposing ends of the body 82. In another aspect, the connection device 80 may have a single tab 84 located at one end of the connection device 80. An outer portion of the tabs 84 has a finger engagement surface 86 configured for engagement with the user's fingers. An inner portion of the tabs 84 has a projection 88 configured for engagement with the locking arrangement 62. The projection 88 extends outward from the surface of the inner portion of the tabs 84. The tabs 84 are connected together by a flexible joint 90 (shown in FIG. 6C) configured to deflect with the movement of the tabs 84 toward or away from each other. The structure of the connection device 80 of the present invention is such that it requires the deliberate action of applying a radially-directed compressive force F on the tabs 84 to cause the projections 88 to be biased against the locking arrangement 62 in order to prevent rotational movement of the inner member 46 relative to the outer member 54, and thereby permit tightening or loosening of the patient delivery device 48 (shown in FIG. 3B) by the application of a rotational force thereto. In this manner, the patient delivery device 48 can be connected to or removed from the inner member 46 without the need for the container 10 described hereinabove with reference to FIGS. 1A-2C.

Referring to FIG. 6B, the projection 88 of each tab 84 is configured for being received within the window 70 of the slot 68. Once placed within the window 70, the tabs 84 can be squeezed toward each other by applying a radially-directed compressive force F. Such force F causes the projections 88 to engage the engagement surface 66 of the locking arrangement 62. In particular, the projections 88 engage the engagement surface 66 of the annular skirt 60 in a region between the teeth 64. In another aspect, a frictional interface between the projections 88 and the engagement surface 66 may be created as a result of an application of a radially-directed compressive force F on the tabs 84. By maintaining the force F, the projections 88 are biased against the engagement surface 66 to prevent the rotation of the inner member 46 relative to the outer member 54. Engagement of the locking arrangement 62 by the projections 88 causes the inner member 46 to be locked relative to the outer member 54, such that an axial or rotational force can be applied to the interface between the inner member 46 and the patient delivery device 48 to attach or detach the connector 12 to or from the patient delivery device 48. By releasing the force F, the connection device 80 reverts to its original shape, where the relative distance between the tabs 84 is increased such that the projections 88 are disengaged from the locking arrangement 62 and the inner member 46 can rotate freely relative to the outer member 54, thereby preventing inadvertent or accidental removal of the patient delivery device 48 from the inner member 46.

In another aspect, the connection device 80 may be naturally biased to interface with the locking arrangement 62 without requiring the application of a radially-directed force F. In this aspect, the connection device 80 may be snap-fitted or clipped to the connector 12 such that the projections 88 are biased against the engagement surface 66 to prevent the rotation of the inner member 46 relative to the outer member 54. The connection device 80 is disengaged by unsnapping or unclipping the projections 88 with an application of a force directed in a radially-outward direction. The connection device 80 may be completely removable from the connector 12, or it may be formed integrally therewith such that the projections 88 can be disengaged from the engagement surface 66.

Although the invention has been described in detail for the purpose of illustration based on what is currently considered to be the most practical and preferred aspects, it is to be understood that such detail is solely for that purpose and that the invention is not limited to the disclosed aspects, but, on the contrary, is intended to cover modifications and equivalent arrangements that are within the spirit and scope of the appended claims. For example, it is to be understood that the present invention contemplates that, to the extent possible, one or more features of any aspect can be combined with one or more features of any other aspect.

The invention claimed is:

1. A connection device configured for engaging/disengaging a connector with a patient delivery device, the connection device comprising:

a flexible body having an arcuate shape;

at least one tab provided at an end portion of the flexible body, the at least one tab comprising a finger engagement surface; and an engagement structure provided on the at least one tab, wherein the engagement structure is configured for engaging a locking arrangement on the connector to prevent rotation of an inner member of the connector relative to an outer member of the connector upon an application of a compressive force on the at least one tab, wherein the at least one tab comprises a pair of tabs located at opposing ends of the flexible body, wherein the pair of tabs are configured to be squeezed towards each other when the compressive force is applied to the finger engagement surface of each of the pair of tabs, and wherein the compressive force applied to the pair of tabs comprises a radially-directed compressive force.

2. The connection device of claim 1, wherein the at least one tab is connected to a flexible joint.

3. The connection device of claim 1, wherein the engagement structure comprises at least one projection configured for engagement with the locking arrangement on the connector.

4. The connection device of claim 3, wherein the at least one projection extends outward from a surface of an inner portion of the tab.

5. The connection device of claim 1, wherein the pair of tabs each comprise a radially inner portion comprising an engagement surface and a radially outer portion comprising the finger engagement surface configured for engagement with a user's fingers.

6. The connection device of claim 1, wherein the locking arrangement on the connector comprises at least one tooth extending from an engagement surface of the locking arrangement, and wherein the engagement structure of the connection device is configured to engage the at least one tooth.

* * * * *